US006441870B1

(12) United States Patent
Rapaich

(10) Patent No.: US 6,441,870 B1
(45) Date of Patent: Aug. 27, 2002

(54) AUTOMATIC GAMMA CORRECTION FOR MULTIPLE VIDEO SOURCES

(75) Inventor: Mark Rapaich, Westfield, IA (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 09/219,127

(22) Filed: Dec. 22, 1998

(51) Int. Cl.[7] .............................................. H04N 5/202
(52) U.S. Cl. ..................... 348/674; 348/254; 348/555
(58) Field of Search ................................ 348/555, 554, 348/558, 254, 256, 675; 345/150, 147

(56) References Cited

U.S. PATENT DOCUMENTS

| 4,489,349 A | | 12/1984 | Okada .......................... 358/168 |
|---|---|---|---|
| 4,786,968 A | | 11/1988 | Kutner ......................... 358/164 |
| 4,799,106 A | | 1/1989 | Moore et al. ................ 358/168 |
| 4,862,265 A | | 8/1989 | Bartow et al. ............... 358/139 |
| 5,132,796 A | | 7/1992 | Topper et al. ............... 358/164 |
| 5,175,621 A | | 12/1992 | Maesato ....................... 358/164 |
| 5,196,924 A | * | 3/1993 | Lumelsky et al. ............. 358/32 |
| 5,258,829 A | * | 11/1993 | Matsunaga et al. ........... 358/30 |
| 5,294,986 A | | 3/1994 | Tsuji et al. .................. 348/672 |
| 5,319,450 A | * | 6/1994 | Tamayama et al. .......... 348/692 |
| 5,483,259 A | | 1/1996 | Sachs .......................... 345/153 |
| 5,499,040 A | * | 3/1996 | McLaughlin et al. ....... 345/146 |
| 5,589,889 A | | 12/1996 | Kawaoka ..................... 348/674 |
| 5,610,726 A | * | 3/1997 | Nonoshita et al. .......... 358/442 |
| 5,671,021 A | | 9/1997 | Kumada et al. ............. 348/644 |
| 5,687,167 A | * | 11/1997 | Inoue .......................... 382/267 |
| 5,815,135 A | * | 9/1998 | Yui et al. ...................... 345/97 |
| 5,877,819 A | * | 3/1999 | Branson ...................... 348/701 |
| 6,057,889 A | * | 5/2000 | Reitmeier .................... 348/555 |

* cited by examiner

Primary Examiner—Victor R. Kostak
(74) Attorney, Agent, or Firm—Schwegman, Lundberg, Woessner & Kluth, P.A.

(57) ABSTRACT

A system has video output connections capable of connecting to different display devices. The system has input connections capable of receiving image signal from multiple sources. A table of gamma values is indexed by both the display type and image source type. A software or hardware module applies a gamma correction from the table to the received video to transform it to have a gamma consistent with that of the display device. In a further embodiment, the images are encoded with a gamma identifier which is used to index into the table of system gammas. A video card that detects video source and display is also described. The video card utilizes a table of gamma values indexed by video source and display type and operating mode. Images are then corrected by the card to display properly on the display.

17 Claims, 4 Drawing Sheets

|    | M1  | M2     | M3 | M4 | M5 |
|----|-----|--------|----|----|----|
| S1 | 1   | 1.4    | X  | X  | X  |
| S2 | .81 | 1.3636 | X  | X  | X  |
| S3 | a   | b      | c  | d  | e  |
| S4 | X   | X      | X  | X  | X  |
| S5 | X   | X      | X  | X  | X  |

FIG. 2

AUTOMATIC GAMMA CORRECTION FOR MULTIPLE VIDEO SOURCES

FIELD OF THE INVENTION

The present invention relates to gamma correction in computer systems and in particular to the automatic correction of gamma for multiple video sources.

BACKGROUND

Cathode ray tubes, commonly referred to as "CRTs", are made with electron guns which are controlled by electromagnetic fields to provide a picture on a screen. The electromagnetic fields are modulated by an input voltage representative of desired intensity. In the early days of television it was discovered that CRT's do not produce a light intensity that is proportional to the input voltage which controls the strength of the fields. Instead, the intensity produced by a CRT is proportional to an input voltage varying between zero and 1.0 raised to the power of a constant referred to as gamma. Gamma can be defined as a constant which is used to account for the non-linear relationship between pixel values in an image and the displayed intensity of each pixel typical for the CRT. The value of gamma varies depending on the CRT, but is usually close to 2.5. Thus, an input voltage of 0.5 raised to the power of 2.5 results in an image intensity of 0.177, considerably less than intended.

Most sensors used in television cameras produce output voltages proportional to scene intensity. A correction for CRT gamma must be applied to the camera signal to avoid having portions of the scenes appear too dark on the TV set. When television standards were defined it was decided to correct for the gamma of the CRT in every television set by using a correction circuit in the camera. Each camera was designed to apply a gamma which is close to the inverse of the gamma inherent in TV sets. A gamma for the camera of 0.45 (approximately 1/2.2) was chosen to simultaneously correct for the CRT gamma of 2.5 and also to compensate for the apparent reduction of contrast which occurs when a TV is viewed against the dim background typically found in a living room. Applying a gamma of 0.45 is referred to in the art as applying a gamma correction of 2.2.

Many computer software applications ignore the effect of CRT monitor gamma or display gamma. Application software and other types of software provide information to be displayed visually on a CRT. This information is stored in a frame buffer, and is converted linearly into voltages that drive the CRT in the display. The values in the frame buffer are not proportional to the resulting intensity. A frame buffer value of ½ the maximum intensity will produce less than ½ the intensity on the display.

Some display systems contain hardware lookup tables that correct for monitor gamma. The hardware lookup table contains a specific gamma value necessary to offset the gamma of the CRT and provide a better display of desired images. On these systems, the frame buffer values provided by the application are corrected for the gamma of the CRT by a lookup table in the display controller, producing a display system gamma of 1.0 which linearly maps frame buffer values into intensity. In U.S. Pat. No. 5,589,889 to Kawaoka, gamma lookup tables are set by a processor for both a desired video camera and also for a desired display device. The lookup tables appear to contain a gamma setting for just one device.

The lack of standardization in dealing with monitor gamma has caused significant problems with entities like the World Wide Web which distribute images to different types of displays. An image that looks good on one brand of display might have certain colors, such as mid tones too bright or too dark on a different brand of display, because of the difference in the displays' gamma. Lack of gamma correction also affects color hues by changing the relative intensities of the red, green, and blue colors in a non-linear fashion.

Some file formats, such as the tagged information file format (TIFF) and the proposed portable network graphics (PNG) format have provisions for specifying the gamma for each of the red, green and blue channels. However, there are still many other sources of video and image, referred to as content, which do not provide gamma. In addition, many displays also have different gamma, making it extremely difficult to ensure that a display is properly corrected for the content to be displayed. This is particularly a problem when a laptop computer user desires to use a display different than the display provided with the laptop. For example, a laptop computer user working at home may use a large CRT monitor or a projection display for a presentation instead of the monitor integrated into the laptop. There is a problem ensuring that gamma is corrected for all such displays. If the user happens to know the gamma of the content, along with any gamma correction currently provided by the laptop, and still further the gamma of the display device, and yet further has the ability to change one of the gammas, the overall gamma can be properly set. Not many users have this ability. There is a need for correcting all these gammas conveniently and accurately.

SUMMARY

Multiple gamma profiles are provided for combinations of multiple display types and content sources. Gamma correction is then performed by automatically selecting the appropriate profile for a detected combination of display and source such that content is displayed with a desired intensity.

In one embodiment, a computer system has a video output connection capable of connecting to two or more different display devices. A system video input connection is capable of receiving video from at least one of multiple video sources. A table of gamma profiles is indexed by both the display and video source. A software module applies a gamma correction from the table to the received video to provide it to the display. When the display applies its gamma, the video is displayed with the proper intensity. In a further embodiment, the video is encoded with a gamma identifier which is used to index into the table of system gammas, or is used to calculate the proper correction.

In another embodiment, gamma correction is digitally controlled by software in a video driver. A number of predetermined settings are stored in a memory and recalled when different display devices are detected or selected. Detection of a different content or video source triggers the recalling of a setting corresponding to the source. System gamma is then set in accordance with the setting to arrive at a total gamma which provides an optimal image display.

In a further embodiment of the invention, gamma correction is performed by a video card to correct either a video source or content gamma. Electronic circuitry within the video card evaluates a source signal and performs necessary calculations to correct the source signal based on gamma values stored in its memory for the ultimate display at the display device.

DESCRIPTION OF THE FIGURES

FIG. 2 is a block diagram of a set of profiles containing gamma settings for various combinations of content and display devices.

DETAILED DESCRIPTION

Figure 1:
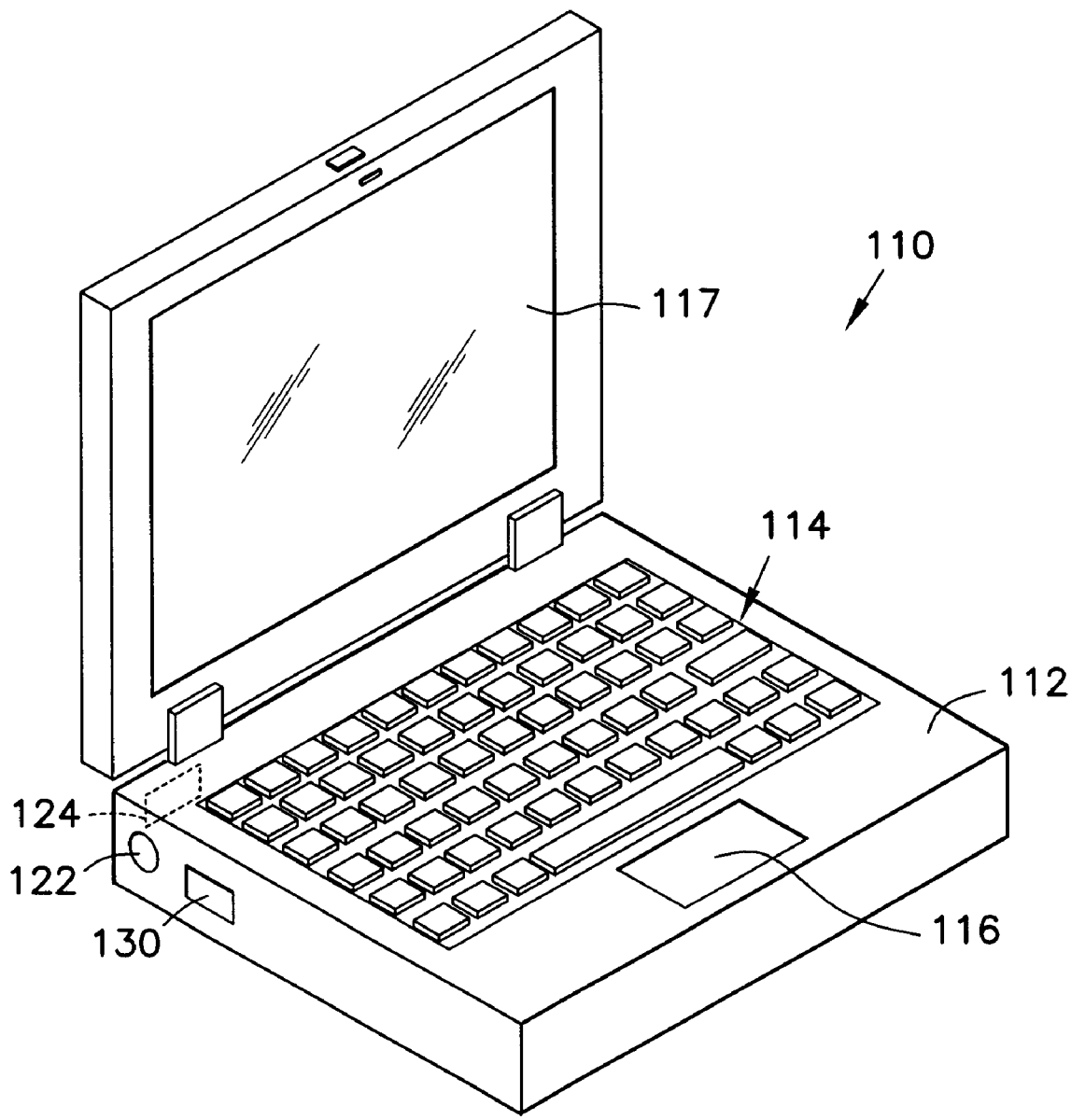
FIG. 1 is a block diagram of a typical computer system in accordance with the present invention.

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

A standard personal computer system is first described, showing multiple sources of video and multiple display devices which can be used. In one embodiment, the personal computer is a laptop computer such as the Gateway 2000 Solo (Gateway 2000 and Solo are trademarks of Gateway 2000, Inc.) as shown generally at 110 in FIG. 1. The system may also be a video system or set top box. A multidimensional gamma lookup table is then described along with a video driver program for selecting the optimal gamma from the lookup table based on the video to be displayed, and the type of display device on which the video is to be displayed. The terms display and monitor are used interchangeably herein consistent with the nomenclature currently used in the computer industry. Display is used more in conjunction with laptop computers, while monitor is more normally associated with desktop and tower personal computers.

Computer 110 is shown in block form having a body 112 containing a keyboard 114, touchpad 116 and multiple video output connectors 122, 124. Inside body 112 are at least one processor, multiple busses, a disk drive, a CD drive, a video card or circuitry and one or more arrays of memory such as main memory, ROM and video memory. A flat panel display 117 is the computer's standard image and video viewing device. However, other display devices are commonly used with the computer. A video output connector 122 is commonly used to drive common television display devices, while a second video output connector 124 located on the back side of body 112 is used to drive a CRT device to obtain a larger viewing screen area with higher quality. Further image projection systems may be driven via these connectors. Each of these different display devices may exhibit different gammas, and may provide some gamma correction of their own.

A set of gamma profiles or values is shown in FIG. 2. The term "gamma" refers to a constant used to account for the nonlinear relationship between pixel values in an image such as a video image, and displayed intensity of each pixel that is typical for a CRT. Most CRTs have a gamma of about 2.5. To correct this, the input signal to the CRT is raised to the power of 1/2.5. This causes the displayed intensity to correctly reflect that intended for the image and the input signal is referred to has having a gamma correction of 2.5. It should be noted that the gamma correction for televisions applied by a television camera is only 2.2 to account for the normally dim viewing environment of a living room. The gamma profiles are provided for multiple different sources, S1, S2, S3, S4 and S5 and multiple different display devices or monitors M1, M2, M3, M4 and M5. Since both monitors and sources may each have a different gamma or gamma correction, the combination of their gammas is represented in the profile which is indexed by both source and monitor.

For example, some images may already have a gamma or gamma correction associated with them, such as those produced by some scanners. For instance, an image scanned from source S1 with a gamma of 1.8, results in a stored image signal raised to the 1/1.8 power of the scanned image signal. Hence, an image produced by this scanner already has a gamma correction of 1.8. This will display nicely on a monitor M1 having a built in gamma correction of 1.4 since the total power raised will be 1.4×1.8 which is approximately equal to 2.5, the inherent gamma of a CRT in the monitor. However, it will not display correctly on monitor M2, which has a gamma of 2.5 with no built in correction. In this case, the profile value retrieved is a gamma correction of 1.4, so that the image will have a corrected gamma of 2.5 to match the uncorrected M2 gamma value of 2.5. This results in images from source S1 displaying correctly on monitor M2.

Alternatively, source S2 is from a television camera, and is received by the computer system via cable or broadcast NTSC or other standard format including MPEG, CVD, CD or satellite broadcast. It can be received via modem, cable modem or other video-in device indicated at 130 in FIG. 1. As mentioned in the background section, most television cameras provide a video signal with a gamma correction of 2.2. Thus, a further correction of 1.13636 is applied if desired for monitor M2 with an uncorrected gamma of 2.5. Note that for monitor M1, the gamma would be over corrected. To avoid over correction, a profile value of 0.81 is applied to the image signals prior to sending them to M1 for a final gamma value of 2.5. In further embodiments, S3 may provide image signals in a new format which may specify its gamma. In that case, each of the corresponding values in the S3 row for the available displays are set dynamically by functions a, b, c, d, and e, as the gamma is received from the source. Functions a, b, c, d, and e are simple mathematical functions which determine the correction needed to bring the entire system gamma to 1.0 or other desired number. They simply take the known CRT gamma as specified by the manufacturer, and divide it by a combination of the gamma corrections multiplied together. One such function is:

$$\text{Additional Gamma Correction} = CRT\ gamma/(GC1 \times GC2 \ldots \times GCn)$$

where GC corresponds to gamma correction, of which there may be up to "n" in number. This result is a further gamma correction that is applied to the image signals prior to sending such signals to the monitor for display. Further examples of monitors include, but are not limited to active matrix, passive matrix, plasma, CRT, flat panel, projection displays, and HDTV, each of which may have different gammas that are easily accounted for by the present invention.

Figure 3:
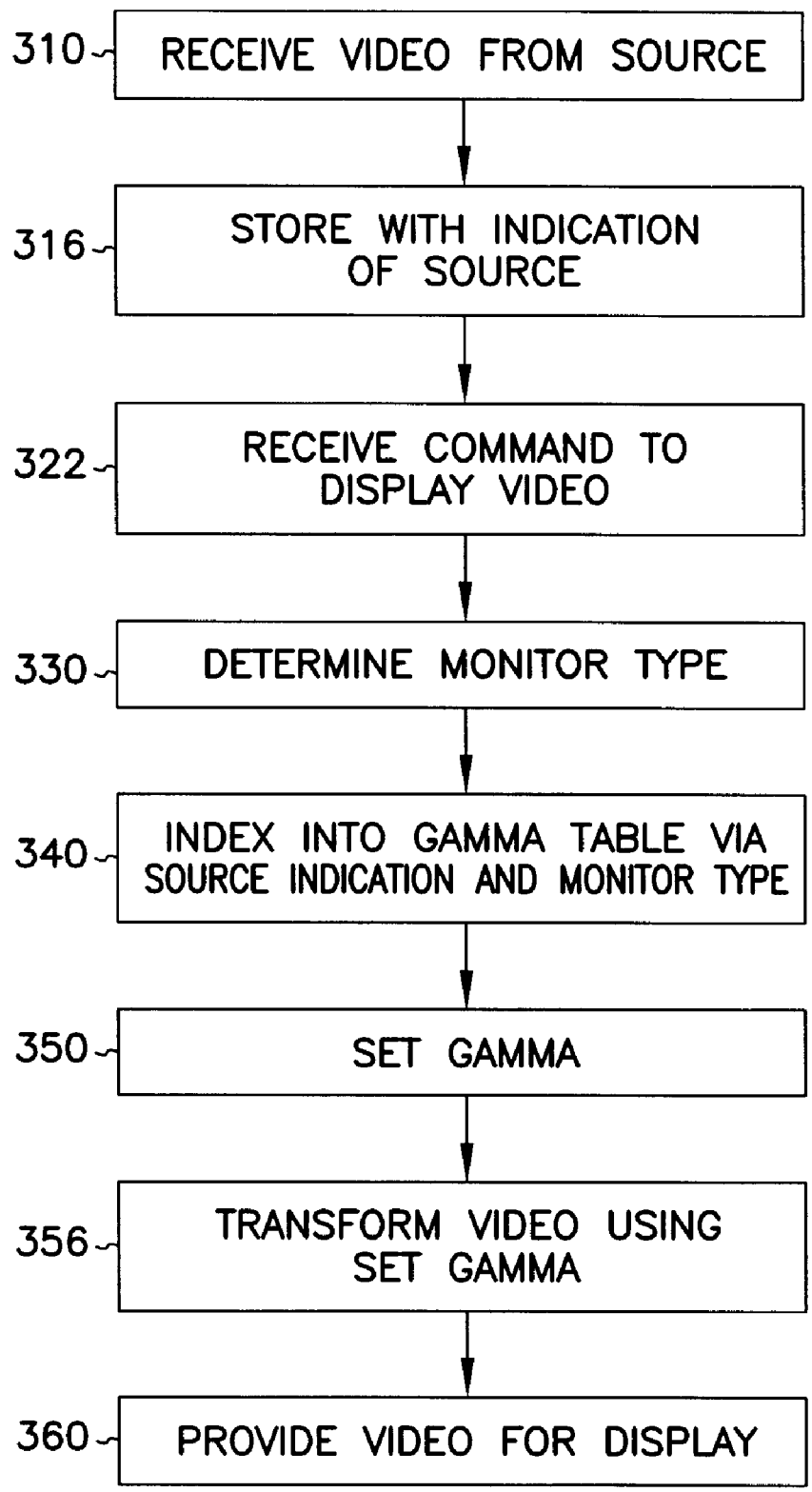
FIG. 3 is a flow chart of a module used to select profiles and setting gamma for the computer system of FIG. 1.

A flowchart of a video driver implementing the present invention in one of many available computer programming languages such as C or C++ is shown in FIG. 3. Video or image signals are received from a source at 310, are optionally stored, either on secondary storage, main memory or video ram at 316. The signals are tested to determine an indication of the source or a gamma value. A command to display the stored video signals is received at 322. This command may cause display of the video signals directly without intermediate storage or may be displayed from secondary storage. In the first case, the gamma of the image or video is determined by knowing the origin or source of the video and may be tracked by the operating system or other code, such as application code. At step 330, the monitor type is determined, either from the command to display, or from system information indicating which monitor is to be used, or which monitor is a primary monitor, since it is possible in some embodiments to provide two different output display streams. In one embodiment, each video output connector is configured for a specific display device. In other embodiments, each video output connector can determine which type of display it is coupled to, or can read the display's gamma from a memory device such as a ROM in the display having a gamma value programmed in at the time of manufacture of the display.

Once both the display device and video source are known, the gamma profile table is accessed by a representation of the source and device, either by an identifier or a gamma value to find the appropriate gamma correction at 340. The gamma is then set at 350, and a correction algorithm is used at 356 in a well known manner to transform the video images by use of the gamma profile correction. The transformed image signals are then sent to the display at 360.

Figure 4:
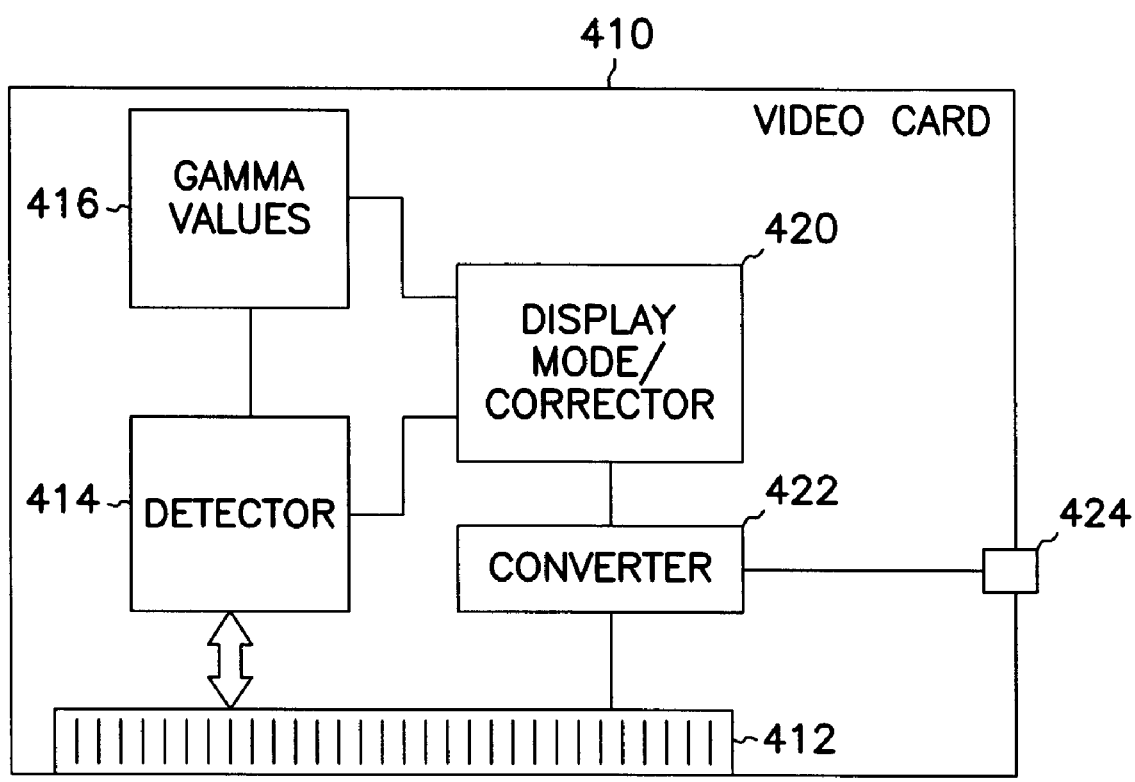
FIG. 4 is a block diagram of a circuit embodiment of the present invention.

A video card shown at 410 in FIG. 4, may be part of the personal computer described in FIG. 1, or part of a video system, set top box or similar device. It may also be incorporated on a system board within the personal computer. The video card has several elements shown in block format which comprise circuitry or various combinations of circuitry and software. A row of connectors 412 provide physical connections to, for example, a bus in the system. A detector 414 detects different input video sources and output displays connected to the system as described above. A memory 416 is coupled to detector 414 and stores indexed gamma values corresponding to a detected input video source and output display. The detector further detects a mode that the display is set to, which may require different gamma values in order to properly display images. A corrector block 420 calculates a correction factor based on the indexed video signal gamma value and the output display gamma which may also include a mode gamma correction.

A converter 422 is coupled to the corrector 420 and provides the correction value to the output display device for application to image signals, or actually applies the gamma correction directly to the image signals which are provided either back through connectors 412 or through one or more video ports 424 which are used to coupled directly to other video devices, including display devices of the various types previously described.

It is to be understood that the above description is intended to be illustrative, and not restrictive. Many other embodiments will be apparent to those of skill in the art upon reviewing the above description. For instance, the gamma of the video source can be stored with the video data as a parameter or variable in an object, and used as an index into the table. In the alternative, an identification of the source which may be used as an index into the table may be stored with the video data. Thus, the table can have both a gamma and a source identification as one index into the table, and a gamma and/or monitor type as the other index into the table. In still a further embodiment, the table is replaced by a calculation step. If both the source and display gammas are known, or looked up in separate tables based on the identifications of the source or display, a simple formula as identified above is used to dynamically calculate a system gamma to be applied to the video data prior to sending to the display. The scope of the invention should, therefore, be determined with reference to the appended claims, along with the full scope of equivalents to which such claims are entitled.

What is claimed is:

1. A system comprising:
    a video output connection connectable to one or more different display device types;
    a video input connection capable of receiving image signals from a plurality of sources;
    a table of gamma corrections indexed by both display and video source; and
    a module for applying a gamma correction from the table to the received image signals.

2. The system of claim 1 wherein the plurality of image sources comprise sources selected from the group consisting of MPEG, NTSC, CVD, CD, TIFF, NPG and satellite broadcast signals.

3. The system of claim 1 wherein the different display devices are selected from the group consisting of active matrix, passive matrix, plasma, CRT, flat panel and projection displays.

4. The system of claim 1 and further comprising a memory for storing the image signals with an indication of the source of the signals.

5. The system of claim 1 wherein the module comprises a video driver.

6. A video system comprising:
    a plurality of video sources;
    a video output connection capable of connecting to different types of monitor devices;
    a table of gamma profiles indexed by both monitor type and video source;
    a module that obtains video from an identified source and accesses the table of gamma profiles based on the identified source and the type of monitor on which the video is to be displayed, to obtain a gamma value, and applying the gamma value to the video to compensate for the gamma of the video source and the monitor device.

7. A method of dynamically compensating for gamma of image sources and display devices comprising the steps of:
    receiving an image signal from an image source;
    determining a display device type on which the image signal is to be displayed;
    determining a gamma correction value based on the image source and display device type; and
    transforming the image using the determined gamma correction value.

8. The method of claim 7 wherein the gamma correction value is determined from a table of gamma profiles indexed by video source and display device type.

9. The method of claim 7 and further comprising the step of displaying the transformed image on a display of the type determined.

10. The method of claim 7 wherein the image signal comprises a portion of a video signal.

11. A machine readable medium having instructions stored thereon for causing a suitably programmed computer to perform the steps of:
    receiving video from one of multiple video sources;
    designating a monitor device on which to display the video;

retrieving a gamma value from a table of gamma profiles indexed by the one of multiple video sources and the monitor device; and transforming the video based on the retrieved gamma value.

12. An image display system comprising:

a video output connection capable of connecting to different display devices;

a video input connection capable of receiving image signals from multiple image sources;

means for dynamically determining a gamma correction based on gammas of both a selected display and a selected image source; and means for applying the gamma correct to optimize display of the image on the selected display device.

13. A video card comprising:

a detector that detects different input image sources and output displays;

memory that stores indexed gamma correction values corresponding to a detected input image source and output display; and a corrector that determines a gamma correction value based on the indexed image signal gamma value and the output display gamma.

14. The video card of claim 13 and further comprising electronic circuitry that relays the correction value to the output display device.

15. The video card of claim 14 wherein the electronic circuitry further comprises a converter that provides the correction value in either digital or analog form.

16. The video card of claim 13 and further comprising a mode detector that detects an output display mode, and wherein the gamma values are indexed in accordance with the output display mode.

17. The video card of claim 13 wherein the corrector applies to correction factor to the image signal.

* * * * *